(12) United States Patent
Leininger (10) Patent No.: US 7,297,397 B2
(45) Date of Patent: Nov. 20, 2007

(54) METHOD FOR APPLYING A DECORATIVE METAL LAYER

(75) Inventor: Marshall Leininger, Canton, OH (US)

(73) Assignee: NPA Coatings, Inc., Cleveland, OH (US)

( * ) Notice: Subject to any disclaimer, the term of this patent is extended or adjusted under 35 U.S.C. 154(b) by 0 days.

(21) Appl. No.: 11/187,260

(22) Filed: Jul. 22, 2005

(65) Prior Publication Data

US 2006/0019089 A1    Jan. 26, 2006

Related U.S. Application Data

(60) Provisional application No. 60/591,108, filed on Jul. 26, 2004.

(51) Int. Cl.
*B32B 15/082* (2006.01)
*B05D 1/38* (2006.01)

(52) U.S. Cl. ............... 428/332; 428/334; 428/463; 427/493; 427/508; 427/402; 427/405

(58) Field of Classification Search ............... 428/332, 428/334, 463; 427/493, 508, 405
See application file for complete search history.

(56) References Cited

U.S. PATENT DOCUMENTS

| | | | |
|---|---|---|---|
| 3,991,230 A | 11/1976 | Dickie et al. | |
| 4,180,448 A | 12/1979 | Soshiki et al. | |
| 4,183,975 A | 1/1980 | Sidders | |
| 4,242,413 A | 12/1980 | Iwahashi et al. | |
| 4,315,053 A | 2/1982 | Poth et al. | |
| 4,382,976 A | 5/1983 | Restall | |
| 4,403,004 A | 9/1983 | Parker et al. | |
| 4,407,871 A | 10/1983 | Eisfeller | |
| 4,431,711 A * | 2/1984 | Eisfeller ............... | 428/31 |
| 4,535,024 A | 8/1985 | Parker | |
| 4,560,728 A | 12/1985 | Lewarchik et al. | |
| 4,945,003 A | 7/1990 | Poole et al. | |
| 5,010,458 A | 4/1991 | Fraizer | |
| 5,024,901 A | 6/1991 | Garg et al. | |
| 5,290,625 A * | 3/1994 | Eisfeller et al. ............ | 428/216 |
| 5,425,970 A | 6/1995 | Lahrmann et al. | |
| 5,468,518 A | 11/1995 | Lein et al. | |
| 5,486,384 A | 1/1996 | Bastian et al. | |
| 5,493,483 A | 2/1996 | Lake | |
| 5,656,335 A | 8/1997 | Schwing et al. | |
| 5,773,154 A | 6/1998 | Takada | |
| 5,837,354 A | 11/1998 | Ogisu et al. | |
| 5,877,231 A | 3/1999 | Biller et al. | |
| 5,879,532 A | 3/1999 | Foster et al. | |

(Continued)

FOREIGN PATENT DOCUMENTS

JP       02-120369       5/1990

(Continued)

*Primary Examiner*—Monique R. Jackson
(74) *Attorney, Agent, or Firm*—Pearne & Gordon LLP (57) ABSTRACT

A method for applying a decorative metal finish to a substrate is provided which includes the following steps. The method employs depositing a thermally cured leveling layer overlying the substrate, and then subsequently a radiation-cured layer overlying the leveling layer. A decorative metallic layer then is deposited overlying the radiation-cured layer, which in a preferred embodiment is selected to provide a strong adhesive bond to the deposited decorative metal layer. A layered structure made by the foregoing method also is provided.

43 Claims, 2 Drawing Sheets

U.S. PATENT DOCUMENTS

| | | | |
|---|---|---|---|
| 6,068,890 A | 5/2000 | Kaumle et al. |
| 6,074,740 A | 6/2000 | Scheckenbach et al. |
| 6,077,608 A | 6/2000 | Barkac et al. |
| 6,087,413 A | 7/2000 | Lake |
| 6,090,490 A | 7/2000 | Mokerji |
| 6,096,426 A | 8/2000 | Mokerji |
| 6,103,381 A | 8/2000 | Mokerji |
| 6,156,379 A | 12/2000 | Terada et al. |
| 6,168,242 B1 | 1/2001 | Mokerji |
| 6,200,650 B1 | 3/2001 | Emch |
| 6,221,441 B1 | 4/2001 | Emch |
| 6,242,100 B1 | 6/2001 | Mokerji |
| 6,248,408 B1 | 6/2001 | Lee |
| 6,277,494 B1 | 8/2001 | Mokerji |
| 6,296,903 B1 | 10/2001 | Sapper et al. |
| 6,298,685 B1 | 10/2001 | Tepman |
| 6,361,854 B2 * | 3/2002 | Lein et al. ............... 428/195.1 |
| 6,399,152 B1 | 6/2002 | Goodrich |
| 6,399,219 B1 | 6/2002 | Welty et al. |
| 6,407,181 B1 | 6/2002 | Daly et al. |
| 6,423,381 B1 | 7/2002 | Colton et al. |
| 6,460,369 B2 | 10/2002 | Hosokawa |
| 6,503,373 B2 | 1/2003 | Eerden et al. |
| 6,583,214 B1 | 6/2003 | Haeberle et al. |
| 6,592,665 B2 | 7/2003 | Arverus et al. |
| 6,596,347 B2 | 7/2003 | Emch |
| 6,676,799 B2 | 1/2004 | Eshbach, Jr. et al. |
| 6,679,952 B2 | 1/2004 | Shimizu et al. |
| 6,696,106 B1 | 2/2004 | Schultz et al. |
| 6,747,719 B2 | 6/2004 | Higashi |
| 6,767,435 B1 | 7/2004 | Kitagawa et al. |
| 6,855,437 B2 | 2/2005 | Tolls et al. |
| 6,896,970 B2 * | 5/2005 | Mayzel ..................... 428/458 |
| 6,916,508 B2 * | 7/2005 | Adachi et al. ............. 427/508 |
| 2001/0006091 A1 | 7/2001 | Eikhoff et al. |
| 2002/0102416 A1 | 8/2002 | Mayzel |
| 2002/0119259 A1 | 8/2002 | Karnei et al. |
| 2002/0168528 A1 | 11/2002 | Jonte et al. |
| 2002/0170460 A1 | 11/2002 | Goodrich |
| 2003/0143383 A1 | 7/2003 | Eshbach, Jr. et al. |
| 2003/0165633 A1 | 9/2003 | Ryu et al. |
| 2003/0211353 A1 | 11/2003 | Tolls |
| 2003/0228484 A1 | 12/2003 | Finley et al. |
| 2004/0049308 A1 | 3/2004 | Evers et al. |
| 2004/0077750 A1 | 4/2004 | Sapper |

FOREIGN PATENT DOCUMENTS

| | | |
|---|---|---|
| JP | 04-131232 | 5/1992 |
| JP | 06-297901 | 10/1994 |
| JP | 09-262544 | 10/1997 |
| JP | 10-202784 | 8/1998 |
| JP | 10-323618 | 12/1998 |
| JP | 2001-152385 | 6/2001 |
| JP | 2001-334603 | 12/2001 |
| JP | 2002-080791 | 3/2002 |
| JP | 2002-200700 | 7/2002 |
| JP | 2003-025495 | 1/2003 |

* cited by examiner

METHOD FOR APPLYING A DECORATIVE METAL LAYER

This application claims the benefit of U.S. Provisional Patent Application Ser. No. 60/591,108 filed Jul. 26, 2004, the contents of which are incorporated herein by reference in their entirety.

FIELD OF THE INVENTION

The invention relates generally to a method for applying a decorative metal layer to a substrate and more particularly to a method for applying such a layer to a metal or non-metal substrate having a multi-layered coating to impart desired aesthetic and functional properties.

DESCRIPTION OF RELATED ART

Plating and electroplating are commonly used in the coating industry to apply a metallic coating, such as chromium, to a metal or plastic substrate. The metallic coating is often composed of multiple metal layers plated directly on top of each other, typically copper and nickel before a final layer of chromium.

For both metal and plastic substrates, a smooth surface is desirable to carry out an electroplating operation to deposit the metal layer(s). For metal substrates it is often required to perform several surface preparation steps, including sanding, buffing and polishing, to remove any pits, scratches, or porosity from the surface. If these surface defects are not removed they may be clearly noticeable in the final product. Likewise, certain ceramics may present a porous surface that cannot be plated or coated without significant surface preparation and or sealing. In the case of porous substrates such as metal castings or extrusions, thick layers of zinc and copper usually are plated on the substrate to seal the porous surface, then physically polished before the final decorative metal layer can be plated to the surface. These operations present burdens of increased production time, manpower, materials and energy, as well as environmental costs.

Liquid paint compositions also can be used to provide a particular aesthetic appearance, such as a metallic chrome-like appearance. Incorporating metal flake pigments into the paints can provide a simulated plated appearance. These flakes must nearly touch or slightly overlap each other as a stratified layer within the paint film to simulate the look of a contiguous film. As the concentration and film density of metallic pigments is increased, it becomes more difficult to uniformly coat the metal flakes, thereby weakening the internal cohesive properties of the paint film. Highly loaded metallic paint films are susceptible to intra-coat adhesion failure causing poor environmental durability.

Thermoset paint requires the application of heat to create the cross-linking and cure necessary within the paint to produce a desired appearance. In an attempt to increase the crosslink density of the final paint film, a process of increasing either or both temperature and time during the cure bake is used to increase the extent of cure. While for some formulations this process can increase the crosslink density of the final paint film, it is generally regarded as undesirable because exposing the paint film to temperatures and durations exceeding those recommended by the manufacturer degrades the polymeric vehicle of the paint system. Overbaking the polymeric vehicle can result in loss of gloss, embrittlement, loss of adhesion, and reduced environmental durability. In addition, a significant number of substrates, such as certain types of aluminum or steel castings, are heat tempered and cannot be reheated beyond 400° F. without compromising the structural integrity of the substrate.

It is also known to apply a nickel-chrome alloy and chrome coating by vacuum metallization onto a metal substrate thereby eliminating the application of the decorative metal coating utilizing hazardous solutions. This process entails first applying a polymeric thermosetting powder as a primer coat to provide a smooth surface for the decorative metal coatings. The primer coat is cured at temperatures at or above 450° F. for up to 90 minutes to provide a suitable adhesion surface for the nickel-chrome alloy and chrome metal layers. Subsequent to curing the primer coat, the respective nickel-chrome and chrome metal layers are applied in separate vacuum deposition steps. Upon metallization, the part can be further coated with a different thermosetting powder at a temperature at or above 320° F. for a period of 25 minutes or longer. However, any surface imperfections on the surface of the primer coat will be highlighted in the decorative metal layer deposited thereon.

The process described above has several disadvantages. First, the utilization of high heat for a long duration during the initial primer coat step can change the temper of the metal substrate. Second, two metal layers are applied by separate and successive vacuum deposition steps. These separate steps extend the deposition time beyond a single layer process and cause a decrease in production efficiency. Third, different coating metals for deposition may require different vapor pressures for proper deposition. Different vapor pressures may require additional pumping time, consuming additional production time. Also, using different thermosetting materials can present contamination problems in the application of each material. Finally, it is common in the paint industry that cross contamination of epoxy and acrylic powders is a potential source for surface defects, such as craters and pin-holing. Parts exhibiting such defects after coating are usually not acceptable to the end-user and require the producer to either strip the part prior to reprocess or scrap the part.

SUMMARY OF THE INVENTION

A layered structure is provided including a substrate, a thermally-cured leveling layer overlying the substrate, a radiation-cured layer overlying the thermally-cured leveling layer, and a decorative metal layer overlying the radiation-cured layer.

A method of applying a decorative metal finish to a substrate also is provided, including the following steps: a) providing a substrate having a substrate surface, b) providing a thermally-cured leveling layer overlying the substrate surface, c) providing a radiation-cured layer overlying the leveling layer, and d) providing a decorative metal layer overlying the radiation-cured layer.

DETAILED DESCRIPTION OF PREFERRED EMBODIMENTS OF THE INVENTION

In the description that follows, when a preferred range such as 5 to 25 (or 5-25), is given, this means preferably at least 5 and, separately and independently, preferably not more than 25.

The term "substrate" refers to any material or surface to which a decorative coating is or can be applied by the methods described herein such as, without limitation, metals, thermoset polymers and other plastics, as well as composite materials and ceramics. Furthermore, the shape of the substrate and particularly the surface to be coated can be any part of an assembly or device manufactured by any of various methods, such as, without limitation, casting, molding, machining, extruding, welding, wrought, or otherwise fabricated. One preferred application contemplated herein is the coating of substrates that are automotive components such as wheels, bumpers and trim components such as mirrors, step rails, luggage racks, grills, door or fender panel railing and bump guards, etc. More preferably, the substrate is a steel or aluminum alloy wheel used in the automotive industry.

As used herein, "radiation-cured" refers to a process for curing a material or layer of material, as well as to compositions or materials cured or curable as described in this paragraph, wherein curing is initiated and caused to proceed through the introduction of or in response to some form of electromagnetic radiation. Herein it is preferred the electromagnetic radiation used to cure a radiation-cured composition or layer is ultraviolet radiation ("UV"). Alternatively, other wavelengths of electromagnetic radiation can be used based on selection of appropriate curing initiators, sometimes called photoinitiators, as is well understood in the art, for example radiation that is more or less energetic than ultraviolet radiation, typically X-rays or visible light. In addition, the radiation can be provided in a variety of forms, e.g. it can be supplied from appropriately filtered incandescent bulbs, electron beam radiation, lamps that emit radiation incident to an electrical discharge, such as the well known mercury discharge lamps for generating "UV" radiation, etc. For reasons that will become clear below, infrared radiation is undesirable to initiate curing of radiation-cured materials because infrared radiation transfers thermal energy in the form of heat, which it is desired to minimize during application of the radiation-cured layer as described below. A radiation-cured material or composition is not necessarily intended to imply that the composition or material excludes (i.e. will not also be cured via) other modes of cure or cross-linking initiation; e.g. heat. However, it is preferred such materials or compositions are not heat curable, or at least that in the methods disclosed herein they are not cured or cross-linked through the application of heat.

Metals used as substrates herein can include ferrous metals and non-ferrous metals, such as, without limitation, steel, iron, aluminum, zinc, magnesium, alloys and combinations thereof. In one embodiment, a metal substrate is formed from steel, aluminum, or aluminum alloys.

The term "overlies" and cognate terms such as "overlying" and the like, when referring to the relationship of one or a first, superjacent layer relative to another or a second, subjacent layer, means that the first layer partially or completely lies over the second layer. The first, superjacent layer overlying the second, subjacent layer may or may not be in contact with the subjacent layer; one or more additional layers may be positioned between respective first and second, or superjacent and subjacent, layers.

Figure 1:
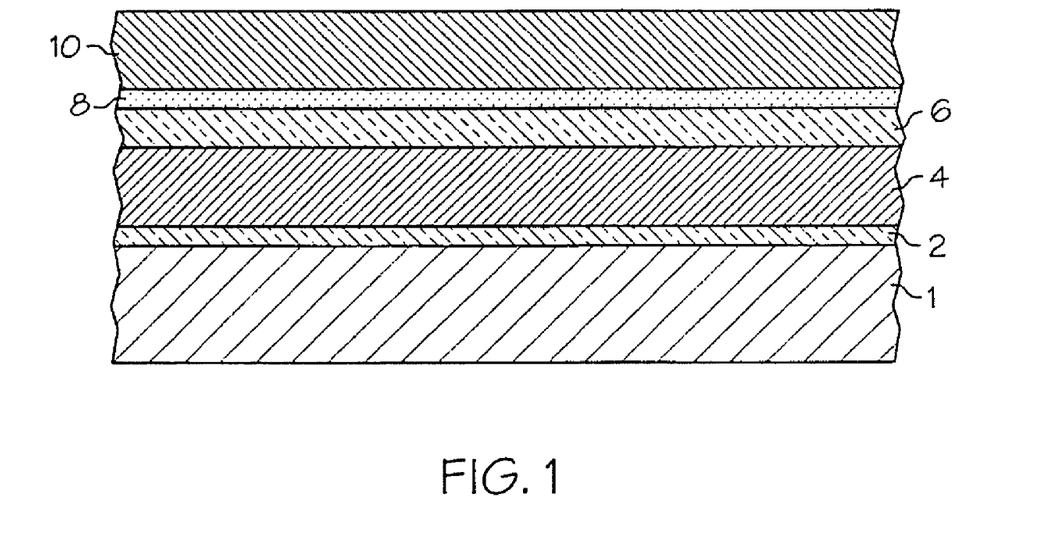
FIG. 1 illustrates a cross-sectional view of a substrate with multiple layers formed thereon.

With reference to FIG. 1, there is shown a substrate 1 having a plurality of layers that comprise a preferred arrangement for applying a decorative metal layer 8 as discussed herein. The layer arrangement on the substrate 1 is as follows: pretreatment layer 2, leveling layer 4, radiation-cured layer 6, decorative metal layer 8 and a top coat layer 10. As seen in FIG. 1, the pretreatment layer 2 is applied onto and overlies the substrate 1, followed by the leveling layer 4 which overlies the pretreatment layer 2, the radiation-cured layer 6 which overlies the leveling layer 4, the decorative metal layer 8 which overlies the radiation-cured layer 6, and the top coat layer 10 which overlies the decorative metal layer 8. It is understood that the layer arrangement shown in FIG. 1 can include additional layers between or on top of the layers. Each of the layers described above and shown in FIG. 1, as well as methods for providing and depositing them, shall now be described.

The pretreatment layer 2 of FIG. 1 is an optional but preferred layer. It is applied to the surface of the substrate 1 to inhibit future oxidation of the substrate surface and to convert the substrate surface to a uniform, inert surface that improves the bonding of the superjacently applied layer, such as the leveling layer 4. Typically, a pretreatment layer 2 of this type is a conversion coating as known in the art. Conversion coating materials can include, but are not limited to, phosphate, iron, zinc, chromium, manganese, or combinations thereof, which can be applied via conventional techniques. For example, such coatings may be applied via conventional spray coating techniques at a temperature of 100 to 180° F. for 60 to 120 seconds. However, other conventional, well-known methods of application can be used to apply the pretreatment layer 2 of FIG. 1.

The leveling layer 4 is applied to the surface of the substrate 1, or pretreatment layer 2 if present, to provide a smooth, level surface for the deposition of the remaining superjacent layers. The leveling layer 4 significantly reduces the amount of mechanical surface preparation of the substrate 1 that will be required to ensure that surface defects will not show or be visible through the decorative metal layer 8 once it is deposited. It should be pointed out the leveling layer 4 is not necessarily considered to completely obviate or eliminate all mechanical surface preparation prior to depositing the decorative metal layer 8. Indeed, some mechanical treatment of either the substrate 1, or of the leveling layer 4 once it is applied and cured, may be desirable in particular applications. What is contemplated, however, is that the as-applied leveling layer 4 surface is or will be significantly smoother than the virgin substrate surface when applied overlying the substrate 1 or pretreatment layer 2, and if additional mechanical surface treatment is to be performed, such will be of considerably lesser degree and can be achieved with less abrasive or corrosive methods and materials than conventionally used.

For example, before applying a leveling layer 4, the substrate 1 is usually cooled to a low temperature, preferably to a temperature below the coalescing temperature of the leveling layer material to prevent premature sintering of the leveling layer 4, which often can cause a ripple or orange peel effect on the surface of the layer, thus requiring surface preparation before the decorative metal layer 8 is applied to the leveling layer 4. Furthermore, defects in the leveling layer 4 such as pin holes, can result if the substrate 1 is not heated prior to applying the leveling layer 4. Preferably, the substrate 1 is heated to 220 to 350° F. after the pretreatment layer 2 is applied to release any trapped gas before the substrate 1 and pretreatment layer 2 are cooled to ambient temperature for application of the leveling layer 4. If the pretreatment layer 2 is not applied, it is also preferred to heat the substrate 1 in a similar manner as described above before applying the leveling layer 4. Such defects should be reworked prior to depositing the decorative metal layer 8, but will require less rigorous, time, cost and labor intensive methods than conventional surface preparations for virgin substrates.

It is preferable that the leveling layer 4 is composed of a material that can be cured at a temperature of 275 to 375° F., and more preferably at 300 to 330° F. The leveling layer 4 can be deposited as a thermally-curable material, preferably a thermoset powder coating composition, that cures when exposed to heat, less preferably to a combination of heat and radiation. Powder coating compositions are comprised of a film forming material or binder as a main component and, optionally, a pigment. The amount of film forming material in the powder coating composition generally ranges from about 50% to 97% by weight of the powder coating composition. Acceptable film forming binder materials include but are not limited to epoxy resin, epoxy-polyester resin, polyester resin, acrylic resin, acryl-polyester resin, fluororesin and the like. Of those noted, an acrylic resin is preferable to provide superior anti-weathering capability and corrosion protection, as is required for automotive wheels. In addition, when thermosetting resins are used as the film forming material, a curing agent also is used. Suitable curing agents may be those known according to the functional group aligned and compatible with the thermosetting resin to be used to initiate and promote cross-linking thereof. Useful curing agents depending on the target functional groups include block isocyanate, aliphatic polycarboxylic acid, aliphatic anhydride, aminoplast resin, triglycidyl isocyanate, hydroxyalkylamide, phenol resin, polyisocyanates, polyacids, polyanhydrides, dodecanedioic acid and mixtures thereof. The amount of curing agent in the powder coating composition generally ranges from about 3% to 50%, by weight. Powder coating compositions can further comprise one or more pigments or other additives such as an ultraviolet absorber, rheology control agent, anti-oxidant, pigment dispersing agent, fluidizing agent, surface adjusting agent, foam inhibitor, plasticizer, charge inhibitor, surfactant or the like. In a preferred embodiment the average particle size of the powder coating particles is about 10 µm to 30 µm, preferably about 15 µm to 25 µm and more preferably about 18 µm.

It is preferred that the leveling layer 4 be product ACE-4119 as supplied by Seibert Powder Coatings, Cleveland, Ohio, which is a clear, colorless acrylic resin. Known properties of ACE-4119 include a 60° gloss value of greater than 90, specific gravity of about 1.11, a cure schedule of 25 minutes at 325° F. metal temperature, recommended film thickness of about 2.0 to 4.0 mm, pencil hardness value after cure of 2H and a minimum storage stability of 2 months at 35° C. Known alternatives to the product ACE-4119 include, but are not limited to, ACE-2253 that is also commercially available from Seibert Powder Coatings, which is also a clear, colorless acrylic resin.

The leveling layer 4 can be applied over the surface of the substrate 1 or of an intermediate layer, such as the pretreatment layer 2 if present, by any of the well-know and conventional methods such as electrostatic spraying, frictional electrification, spraying and fluidized bed.

The leveling layer 4 preferably is a thermally-cured layer that can be cured by any of the well-known and conventional heating methods. Preferably, the leveling layer 4 is pre-cured by heating the substrate 1 and leveling layer 4 from ambient temperature, at which the leveling layer 4 is initially deposited, to approximately 250 to 290° F. via a temperature rise rate of 30 to 80° F. per minute, and more preferably 40 to 60° F. per minute. It is preferred that the substrate 1 and leveling layer 4 be maintained at approximately 250 to 290° F. for 1 to 12 minutes, and more preferably at approximately 265 to 275° F. for 4 to 8 minutes. Subsequent to the pre-cure, the substrate 1 and leveling coat 4 are baked at a temperature of approximately 260 to 375° F. for a period of 10 to 45 minutes. It is preferred that the substrate 1 and leveling layer 4 are baked at approximately 290 to 325° F. for 25 to 35 minutes. Finally, the substrate 1 and leveling layer 4 are cooled to approximately 100 to 200° F., more preferably to approximately 140 to 170° F., prior to depositing the radiation-cured layer 6 described below.

Proper cure of the coating can be measured by a variety of methods known to the industry, such as Differential Scanning Calorimetry, multiple rub with methyl ethyl ketone, dye stain and pencil hardness.

The leveling layer 4 has a dry or cured thickness at least effective to significantly level out the surface of the substrate 1. Generally, this thickness is from 10 µm to 100 µm, preferably from 20 µm to 80 µm, more preferably from 30 µm to 75 µm and even more preferably from about 40 µm to about 65 µm.

The radiation-cured layer 6 of FIG. 1 is applied onto and overlies the leveling layer 4. The radiation-cured layer 6 provides a smooth, level surface to which the decorative metal layer 8 can be applied and further eliminates or reduces the need for additional surface treatment of the leveling layer 4. Applying the radiation-cured layer 6 over the leveling layer 4 can eliminate small surface defects, such as pinholes or fine scratches on the leveling layer 4. These small surface defects on the leveling layer 4 would otherwise be highlighted in the decorative metal layer 8 if not abated through surface treatment methods. As such, the radiation-cured layer 6 prevents and makes unnecessary further surface preparation of the leveling layer 4 to remove such defects. Additionally, the radiation-cured layer 6 provides a smooth, level surface that requires less energy and cure time than that necessary for a heat-cured layer.

The radiation-cured layer 6 provides a desirably smooth surface that exhibits excellent adhesion to the metal layer 8. Specifically, the radiation-cured layer 6 exhibits high surface tension in air once cured, which promotes increased adhesion with the decorative metal layer 8 applied thereto. Strong adhesion between the radiation-cured layer 6 and the decorative metal layer 8 provides significant durability to environmental conditions. Furthermore, the adhesion between these layers is sufficient to withstand subsequent heating in the coating process discussed herein, as well as high temperature applications. For example, it has been shown that adhesion between the preferred radiation-cured layer 6 described below and the decorative metal layer 8 is unaffected or substantially unaffected after being exposed to a temperature of 400° F. for 90 minutes.

Properties of the radiation-cured layer 6 that provide minimal visual defects to the decorative layer 8 include, but are not limited to, high surface density and uniform-smooth surface. More specifically, the high surface density of the radiation-cured layer 6 creates a surface with minimal cavities, ripples and pin holes, which otherwise would be visible in the decorative metal layer 8.

In addition to providing a high energy surface to facilitate decorative metal layer 8 adhesion thereto, it also is desirable that the radiation-cured layer 6 be provided with sufficient properties to provide a more uniformly flat, level surface for applying such layer 8 if necessary or desired. This can be achieved for example, by the pre-heating described below to further level out the radiation-cured layer 6 surface.

A preferred radiation-cured layer 6 is provided as a radiation-curable material, preferably an acrylated or methacrylated polyester urethane liquid, that is deposited on the subjacent (i.e. leveling) layer and then cured to provide the cured layer 6. Typically the radiation-cured layer 6 is comprised of a polymeric film forming material, a radiation sensitive monomer having polymerizable unsaturated bonds, a photopolymerization initiator, and an inert solvent vehicle. The material for the radiation-cured layer 6 should be chosen to produce or provide surface properties that are advantageous to receive a vapor deposited metal layer. For example, the preferred product, UVB22V1 available from Red Spot and further described below, has a unique receptivity to various metals. Both vapor deposited aluminum and chromium exhibit good adhesion to a UVB22VI radiation-cured layer. Whereas, other radiation-cured materials often exhibit adequate adhesion to only a specific metal.

Conventional additives can be incorporated or added into the radiation-cured material layer 6 to impart desired properties thereto. Such additives may include, e.g., polymeric or silicone coating surface improvers, flow improvers, dyes, pigments, flattening agents, anti-foaming agents, light stabilizers and antioxidants, in varying amounts dependent upon desired function and performance of the final coating film. In the composition of the radiation-cured layer 6, it is important to consider that many conventional additives are not required and must be reviewed for any detrimental interference with the metal deposition process.

Suitable inert solvents include ethyl acetate, butyl acetate, acetone, methylisobutylketone, methylethylketone, butyl alcohol, isopropanol, toluene, xylene, or a mixture of solvent types.

In a preferred embodiment, the radiation-cured layer 6 material is the commercially available product UVB22V1, supplied by Red Spot Paint & Varnish Co., Inc, Evansville, Ind., which is a proprietary "UV" curable acrylated urethane liquid resin. Known properties of UVB22V1 include, but are not limited to, 58% weight by solids, density value of 8.4 lbs/gal, VOC value of 3.5 lbs/gal, water resistance to 40° C., heat resistance to 177° C. and thermal shock resistance to 90° C.

The product UVB22V1 is a proprietary composition that includes the components listed below in table 1, in the following weight percents based on information (i.e. MSDS and product data sheet) published by Red Spot.

TABLE 1

| Component | CAS Number | Weight % Less Than |
| --- | --- | --- |
| Butyl Acetate | 123-86-4 | 30 |
| Multifunctional Acrylate | 15625-89-5 | 15 |
| Xylene | 1330-20-7 | 10 |
| Mineral Spirits | 8052-41-3 | 10 |
| Dipentaerythritol Monohydroxypenta-Acrylate | 60506-81-2 | 5 |
| Photo Initiator | 24650-42-8 | 5 |
| Methyl N-Amyl Ketone | 110-43-0 | 5 |
| Ethyl Benzene | 100-41-4 | 5 |

Known alternatives to product UVB22V1 include, but are not limited to, UVB22, UVB510, UVB527 and UVB63, all of which are commercially available from Red Spot Paint & Varnish Co., Inc.

Application of the radiation-cured layer 6 can be accomplished by several techniques known to the industry, such as conventional air atomized spray, conventional air atomized spray with electrostatic charge, electrostatic rotary atomized application as well as others. It is preferred that electrostatic charge spraying is used for its desirable transfer efficiency and uniform thickness of the applied radiation-cured layer 6.

The radiation-cured layer 6 can be cured by irradiation with ultraviolet rays by conventional methods. Preferably, before the radiation-cured layer 6 is exposed to ultraviolet radiation, the layer 6 is heated to a temperature in the range of about 150 to 200° F., and more preferably of about 160 to 180° F. Such moderate or mild pre-heating of the radiation-cured layer 6 is advantageous to promote or cause the thick, viscous layer 6 to flow, thereby presenting a more uniformly flat, even surface. The pre-heating also allows the radiation-cured layer 6 to devolatize, i.e. to evaporate solvents from the layer 6 before it is cured. Heating of the radiation-cured layer 6 can be accomplished by conventional means, with the most preferred method being quartz heat lamps. Less preferably, low velocity filtered and heated air is used to pre-heat the radiation-cured layer 6. It is desirable to heat the radiation-cured layer 6 for a length of about 1 to 6 minutes. The radiation-cured layer 6 is then exposed to ultraviolet radiation for a period of 5 to 500 seconds, preferably 100 to 400 seconds and more preferably 140 to 240 seconds. The curing distance, the distance between the surface of the radiation-cured layer 6 and the radiation source, typically is about 4 to 20 inches, and more preferably about 6 to 12 inches.

Ultraviolet radiation sources having an emission wavelength of about 180 nm to about 450 nm are preferred. Ultraviolet sources include, but are not limited to, sunlight, mercury lamps, arc lamps, zenon lamps, gallium lamps. It is desirable to use high-pressure mercury vapor discharge lamps, which generate "UV" radiation incident to the mercury discharge, to cure the layer 6. High-pressure lamps of this type generally having intensities of 30 W/cm to 400 W/cm are most desirable. It is generally known that high-pressure lamps of this intensity range are capable of quickly exposing a substrate to about 75 to about 7,000 mJ/cm$^2$. It is preferred that an ultraviolet source chosen to cure the radiation-cured layer 6 is capable of producing 3,500 to 6,000 mJ/cm$^2$ within 5 to 500 seconds, preferably within 100 to 400 seconds and more preferably within 140 to 240 seconds.

The radiation-cured layer 6 has a dry or cured thickness preferably in the range from about 1 μm to about 100 μm, or from about 10 μm to about 100 μm. More preferably the layer 6 has thickness of from about 5 μm to about 75 μm, and more preferably from about 15 μm to about 25 μm.

The metal layer 8 of FIG. 1 is applied onto and overlies the radiation-cured layer 6 to provide a decorative or aesthetic appearance to the substrate 1. Preferably, the decorative metal layer 8 is applied over the radiation-cured layer 6 in atomized form. The decorative metal layer 8 can be applied via one of several techniques known to the industry, such as physical vapor deposition, chemical vapor deposition, magnetron sputtering and plasma deposition. Of these processes, physical vapor deposition is the most desirable in the present application. Each of these methods requires a target metal to be atomized, usually in a vacuum chamber, by electric charge, heating or pressurized inert gas. Atoms of the metal are carried to the surface onto which the atoms are to be deposited, and they are deposited thereon until a desired thickness is achieved. The decorative metal layer 8 adheres to the radiation-cured layer 6 as a decorative surface.

Metals suitable for depositing as the decorative metal layer 8 include, but are not limited to, aluminum, nickel, nickel chromium alloy, titanium, chromium, stainless steel, gold, platinum, zirconium, silver, combinations thereof and alloys thereof.

The decorative metal layer 8 has a general thickness of 10 to 2,500 angstroms, preferably from 500 to 2,000 angstroms, and more preferably from about 1,000 to about 1,600 angstroms. In one embodiment, the decorative metal layer 8 has a thickness of about 1150 angstroms.

The top coat layer 10 of FIG. 1 is applied onto and overlies the decorative metal layer 8 to prevent oxidation and environmental damage to the decorative metal layer 8. Preferably the composition of the top coat layer 10 is the same as that of the leveling layer 4. Thus, the method of applying the top coat layer 10 is or can be the same as that described above with respect to the leveling layer 4. Because the methods of applying the leveling layer 4 and the top coat layer 10 can be the same, risk of contamination of powders or other coating materials in the processing area is minimized. Furthermore, the same booth and application equipment can be used to apply both layers, thereby reducing equipment and labor costs associated with coating the substrate 1.

It is understood that although the preferred composition of the top coat layer 10 is the same as the leveling layer 4, alternative compositions of the top coat layer 10 include all those referenced above for the leveling layer 4.

The top coat layer 10 has a dry or cured thickness at least effective to protect the surface of the decorative metal layer 8, as well as the underlying layers and the substrate 1. Generally, this thickness is from 10 µm to 100 µm, preferably from 20 µm to 80 µm, more preferably from 30 µm to 75 µm and even more preferably from about 40 µm to about 65 µm.

Figure 2:
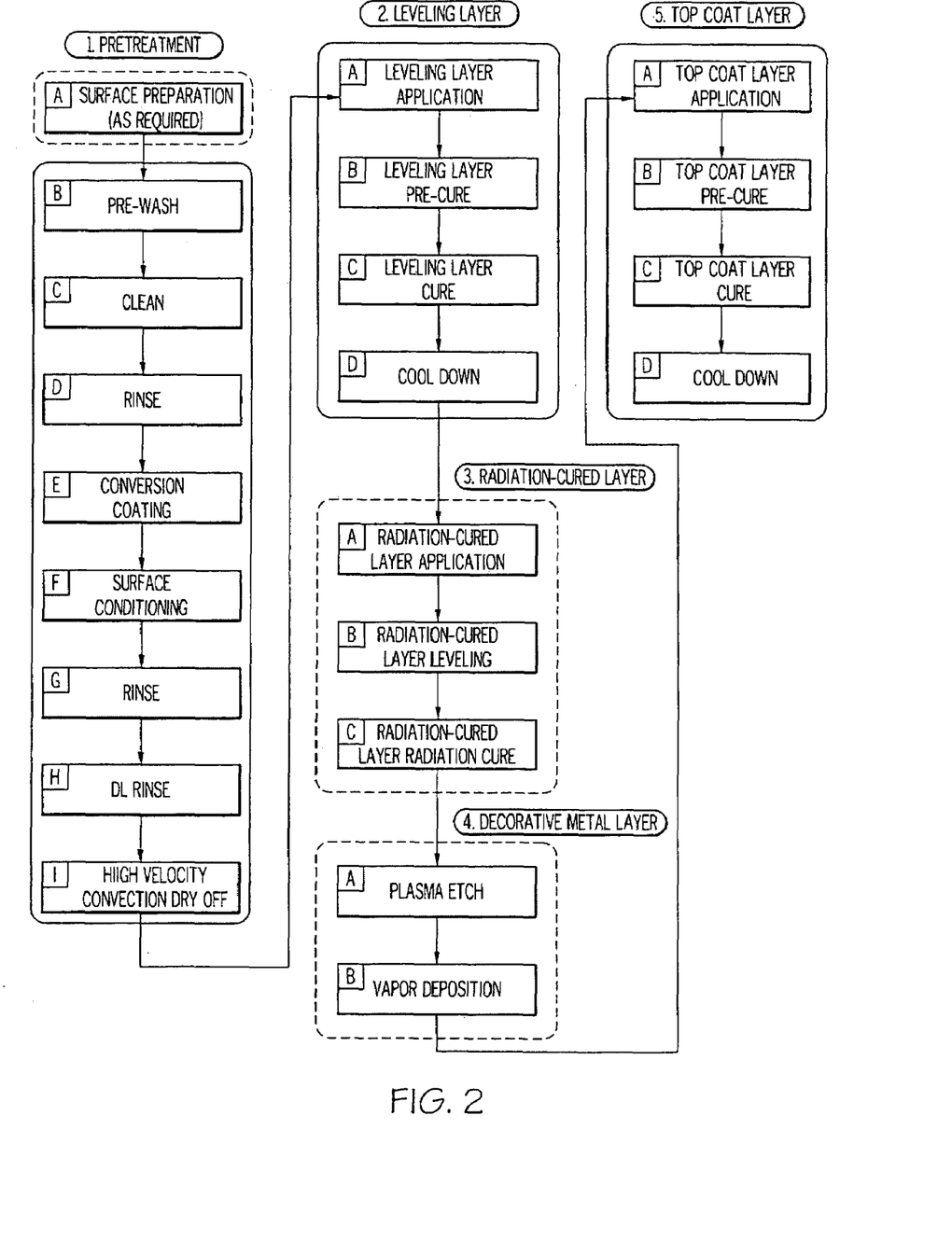
FIG. 2 illustrates a flow diagram of processing steps for applying a multi-layer coating to a substrate.

FIG. 2 shows a top level diagram for a process of applying a decorative metal layer to a substrate according to an embodiment of the invention. As seen from the diagram, the five principal stages for such a process are 1) cleaning or pretreatment of the substrate; 2) applying a leveling layer onto and overlying the substrate; 3) applying a radiation-cured layer onto and overlying the leveling layer; 4) applying a decorative metal layer onto and overlying the radiation-cured layer; and 5) applying a top coat layer onto and overlying the decorative metal layer. As will be evident from the figure, each of these stages includes or incorporates a number of steps. Steps illustrated in FIG. 2, which are not discussed hereinabove, are considered to be conventional and well known to persons having ordinary skill in the art, and for that reason are not discussed in further detail herein. It is considered that an important aspect of the present invention is the provision and deposition of the radiation-cured layer, stage (3) referred to above, and steps incident to this stage are outlined in broken lines in FIG. 2 and have been described in detail hereinabove.

The process shown in FIG. 2 is suitable for applying layers to a substrate in a batch or continuous manner, or a combination thereof. For example, in a batch process, the substrate is stationary during each stage of the process. In contrast, the substrate in a continuous process would move along a conveyor line.

EXAMPLES

In order to promote a further understanding of the coating process and preferred embodiments thereof, the following examples are provided. It is understood that these examples are shown by way of illustration and not limitation.

Example 1

An aluminum automotive wheel rim was coated utilizing the multi-layer coating of the present invention. The rim was first cleaned and degreased with KLEEN SNC110, DEOX 575MU and Permatreat 830MU cleaners supplied by GE Water Technologies. After degreasing, the rim was rinsed with deionized water to remove residual cleaner. The rim was further dried in a convection oven at a temperature of 350° F. for 10 minutes to provide a dry, clean surface for the subsequent layers. After drying, the rim was powder coated with ACE-4119 acrylic resin supplied by Seibert and baked at 260° F. for 6 minutes to pre-cure the ACE-4119 powder. The ACE-4119 powder was further baked at 325° F. for 30 minutes to produce a smooth surface and cure the leveling layer. The measured thickness of the cured ACE-4119 layer was 63 microns. The rim then was cooled to 140° F. and then spray coated with the radiation-curable product, UVB22V1 supplied by Red Spot. The UVB22V1 layer was pre-heated with quartz infrared heat lamps to a temperature of 175° F. for a period of 3 minutes to let the thick, viscous layer flow to flat. The UVB22V1 layer was then exposed to ultraviolet radiation for 2 minutes at a distance of 12 inches from high-pressure mercury discharge lamps that produced a radiation intensity of 6,500 mJ/cm$^2$. The measured thickness of the cured UVB22V1 layer was 25 microns. Pure chromium then was deposited onto the surface of the cured UVB22VI layer (radiation-cured layer) by means of physical vapor deposition in a vacuum chamber to produce a decorative metallic appearance. The measured thickness of the deposited chromium layer was approximately 1150 angstroms. Following the application of this decorative metal layer, a top coat layer comprising the same material as the leveling layer, ACE-4119 powder, was powder coated over the decorative metal layer and then pre-cured at 260° F. for 6 minutes and further cured at 300° F. for 30 minutes. The measured thickness of the cured ACE-4119 top layer was 58 microns. The finished automotive rim displayed a polished, chrome appearance. The adhesion between the chrome metal layer and the UVB22V1 radiation-cured layer exhibited no perceptible defects after the rim was exposed to a temperature of 350° F. for 90 minutes.

Example 2

There is a need for a method of applying a decorative metal layer to a substrate that provides good adhesion of the decorative metal layer to the substrate or underlying layers, such as a pretreatment, leveling or radiation-cured layer. As such, a test panel processed according to the procedure of Example 1 was tested for adhesion of the chromium layer to the radiation-cured UVB22V1 layer in the following manner. The test panel of this example, as well as those in the examples described below, consisted of a 4"×8" aluminum panel with a leveling layer (ACE-4119), radiation-cured layer (UVB22V1), decorative metal layer (chromium) and a top coat layer (ACE-4119), unless otherwise specifically indicated. The process used to create the multi-layer coated test panel was the same as that described in Example 1, and thus the individual thickness for each deposited layer was approximately the same as the corresponding values (i.e. microns and angstroms) described above in Example 1.

The test panel was cross hatch cut as follows. A carbide-tipped knife was used to slice through the multi-layered structure deposited atop the underlying substrate to provide a cross hatch or grid pattern of regular congruent squares. The cutting was performed through all of the superjacently applied layers but did not penetrate the underlying substrate, which care was taken not to mark or score with the knife when cutting. To make the grid pattern, the knife was inserted straight downward (i.e. at a 90° angle relative to the surface of the topmost layer) toward the substrate, and then drawn laterally to make each of the linear cuts which were approximately 20 mm in length. The grid pattern consisted of a first set of 6 cuts parallel to one another and another set of 6 cuts parallel to each other and perpendicular to the first set, thereby resulting in a cross pattern. The parallel cuts were made approximately 2 mm apart. The method of cutting the cross hatch pattern described above resulted in 2 mm×2 mm squares on the surface of the substrate. The cut area (i.e. the cross hatch area of squares) of the test panel was brushed to remove any debris or flakes. Adhesion tape, having a 180-degree peel value to steel of at least 430 N/m, was placed over the cut area of the test panel so that the entire cross hatch pattern was covered. The tape was pressed firmly against the test panel for 10 seconds then removed with a rapid, upward motion. Upon removal of the tape, it was observed that none of the cross hatch squares were removed from the substrate surface. Furthermore, no other visible defects or peeling along the edges of the grid squares were observed. For example, the corner portions of the 2 mm×2 mm squares of the cross hatch area did not peel back or display signs of separation from the substrate. Furthermore, the internal layers of each 2 mm×2 mm square of the cross hatch area did not separate from one another. That is, the ACE-4119 layer, UVB22V1 layer, chromium layer and the top ACE-4119 layer did not separate or display visible signs of adhesion loss after the tape was removed or on removal of the tape.

Example 3

A test panel processed according to the procedure of Example 1 was tested for humidity resistance in the following manner. The test panel was exposed to 100% relative humidity at approximately 38° C. with condensation on the test panel during the entire test period. The test panel was exposed to the above referenced conditions for a period of 96 hours and then for an additional 240 hours. Deionized water was used to produce the water vapor in the testing apparatus. The apparatus in which the test panel was placed was designed so that no condensation on the walls or roof of the apparatus was allowed to drip onto the test panel. After 96 hours, the test panel was removed from the test apparatus, dried and inspected for defects. No defects on the test panel were observed after it was dried. There were no signs of peeling, bubbling, blistering or cracking of the layers. After the test panel was placed in the apparatus for an additional 240 hours at the conditions described above, and then subsequently removed and dried, no defects were observed on the test panel. Similarly, no signs of peeling, bubbling, blistering or cracking were observed as well.

Example 4

A test panel processed according to the procedure of Example 1 was tested for salt spray resistance in the following manner. The only difference from the material and layer arrangement of the test panel described in Example 2 was that here the decorative metal layer was a chromium-nickel alloy as opposed to the chromium metal layer of Example 2. The test panel was first scribed with a 2 inch long cut using a straight shank, tungsten carbide tip, lathe tool. The cut was made perpendicular (i.e. straight-down at a 90° angle) to the surface of the substrate, as opposed to being cut at an angle less than 90° with regard to the surface of the substrate. The lathe tool was mounted in a scribing fixture to make the straight scribe cut on the test panel. The scribe cuts, as discussed herein, were never made with a free-hand method. The scribe cut was tested with a multimeter to confirm end-to-end electrical continuity. The depth of the cut penetrated through all the layers on the surface of the substrate, but did not significantly pierce the surface of the substrate.

The test panel was then exposed, in a closed chamber, to a continuous fog of salt water. The chamber in which the test panel was placed was designed so that no condensation on the walls or roof of the chamber was allowed to drip onto the test panel. The chamber was maintained at approximately 35° C. during the entire testing period of 1000 hours. The salt-water solution used during the test was prepared by dissolving approximately 5 grams of salt (NaCl) per 95 ml of water. The salt-water solution had a specific gravity range of 1.0255 to 1.0400 at 25° C. and a pH range of 6.5 to 7.2. After the test panel was removed from the chamber, no visible signs of corrosion were observed on the surface of the test panel and only mild signs of corrosion less than 2 mm from the edge of the scribed cut were visible. It was also observed that there was no more than 3 mm of creep back from edges of the scribe cut, and no other loss of adhesion after air was used to blow out the scribe cut. To blow out the scribe cut, a high-pressure nozzle ejecting ambient air was placed in the cut and rapidly moved from side to side along the length of the cut.

Example 5

Two wheel sections processed according to the procedure of Example 1 were tested for chip resistance in the following manner. Both sections were exposed to gravel being ejected by a gravelometer. The type of gravelometer used was model QJR manufactured by Q-Panel of Cleveland, Ohio. The air pressure used to operate the gravelometer was maintained at approximately 70 psi and the gravel used had an average diameter of approximately 9.5 mm to 16 mm. Two pints of gravel were poured into the gravelometer for a period of 15 seconds. Before testing for chip resistance, the first wheel section was maintained at a temperature of 25° C., whereas the second wheel section was maintained at −30° C. for 4 hours. The first section was exposed to gravel ejected from the gravelometer at approximately 25° C. The second section was removed from the freezer and tested at approximately −30° C. After testing, the wheel sections were allowed to equilibrate to 25° C. Conventional masking tape was used to remove any loose chips or debris on the surface of the sections. The wheel section tested at 25° C. exhibited chipping resistance equal to or better than a rating of 8 based on the well-known General Motors Corp. GM9508P Chip Resistance of Coating test scale, which is commonly used in the industry. The wheel tested at −30° C. exhibited chipping resistance equal or better than a rating of 7 on that scale.

Example 6

Two test panels manufactured according to the procedure of Example 1 were tested for etching distortion and discoloration from exposure to severe environmental conditions in the following manner. Multiple drops of 10% by weight sulfuric acid in water solution of pH 3.0, 0.75% by weight calcium sulfate in water solution of pH 4.0, deionized water and tap water were placed on the surface of the first test panel. The first test panel was heated to a temperature of 80° C. from 25° C. within a period of 2 minutes, and maintained at 80° C. for a period of 30 minutes. After 30 minutes the drops were rinsed off of the first test panel with deionized water and the test panel was allowed to equilibrate to 25° C. After the first test panel reached 25° C., there were no visible no changes or defects on the surface of the top ACE-4119 layer. There was also no discoloration of the top ACE-4119 layer.

Two drops of each test solution referenced above were placed on the surface of the second test panel. The panel was aged at room temperature, approximately 25° C., for 24 hours at a relative humidity of 50%. After 24 hours, the drops were rinsed off the second test panel with deionized water and the panel was dried. Upon observation, no visible defects, surface changes, or discoloration was observed.

Example 7

Two test panels manufactured according to the procedure of Example 1 were tested for solvent resistance in the following manner. After 72 hours from the time the first test panel was manufactured, it was submerged separately in a commercial wheel cleaner as is commonly used in public carwash facilities for a period of 24 hours. After a 24-hour period, the first panel was removed from the cleaner solution and rinsed with deionized water before being dried. After each removal, there was no visible degradation on the surface of the top ACE-4119 layer. Furthermore, the top ACE-4119 layer had a pencil hardness test value of 2H before and after the test.

The testing procedure used on the second test panel was to determine the top ACE-4119 layer's relative resistance to crazing caused by exposure to tire and wheel cleaners. One drop of isopropyl alcohol was placed on the surface of the second test panel at a temperature of 25° C. after it was allowed to stand for 72 hours after manufacture. Observation of the top ACE-4119 surface began as soon as the drop was placed. The isopropyl alcohol drop was allowed to sit on the surface of the second test panel for 1 minute. After 1 minute, it was rinsed off with deionized water. No visible signs of cracking or degradation of the surface of the test panel were observed.

Example 8

A test panel manufactured according to the procedure of Example 1 was tested for outdoor weathering resistance in the following manner. The test panel was exposed to Southern Florida weather for a period of one year. The test panel was placed at a 5° angle from horizontal, facing South, in an outside environment receiving full exposure to sunlight. Southern Florida was chosen for its high humidity, high temperature and high incidence of radiant energy. The test panel was thoroughly washed with a mild liquid detergent, such as Ivory dish soap, before being placed outside. Once each month of the 12-month test period the test panel was cleaned with deionized water so clear observations of the substrate surface could be made. All of the one-months observations indicated no decrease in gloss, color change and surface cracking. The observations were made by comparing a portion of the panel unexposed to the sunlight to a portion that was exposed. A portion of the test panel was covered by the support flap or band that holds the test panel in position, thereby avoiding exposure to sunlight of said portion. After the 12-month test period, no visual reduction in gloss or change in color was observed on the surface of the test panel. Additionally, no surface cracking or blistering were visually detectable.

Example 9

A test panel manufactured according to the procedure of Example 1 was tested for copper-accelerated acetic acid salt spray resistance in the following manner. The only difference from the material and layer arrangement of the test panel described in Example 2 was that here the decorative metal layer was a chromium-nickel alloy as opposed to the chromium metal layer of Example 2. The test panel was first scribed using the method described in Example 4. The test panel was then exposed, in a closed chamber, to a continuous fog of copper-accelerated acetic acid salt spray (CASS). The chamber in which the test panel was placed was designed so that no condensation on the walls or roof of the chamber was allowed to drip onto the test panel. The chamber was maintained at approximately 49° C. during the entire testing period of 168 hours. The CASS solution used during the test was prepared by dissolving approximately 1 gram of cupric chloride ($CuCl_2$ $2H_2O$) per 1 gallon of water, then approximately 5-6 ml of glacial acetic acid was added. The CASS solution had a specific gravity range of 1.0255 to 1.0400 at 25° C. and a pH range of 3.1 to 3.3. After the test panel was removed from the chamber, no visible signs of corrosion were observed on the surface of the test panel or within the scribed cut. It was also observed that there was no more than 3 mm of creep back from edges of the scribe cut, and no other loss of adhesion after air was used to blow out the scribe cut. To blow out the scribe cut, a high-pressure nozzle ejecting ambient air was placed in the cut and rapidly moved from side to side along the length of the cut.

Example 10

Four test panels manufactured according to the procedure of Example 1 were tested for thermal shock resistance in the following manner. Each of the four test panels contained a specific metal layer in which the first, second, third and fourth test panels contained an aluminum, nickel, chromium and chromium-nickel alloy metal layer, respectively. Each test panel was first submerged in a water tank for 3 hours at a temperature of approximately 38° C. The water was maintained at a maximum of 5 ppm salt (NaCl) during the 3 hour test period. The water was also aerated by placing a ¼" plastic tube at the bottom of the tank to generate at a minimum one bubble per second. After 3 hours, the test panels were removed from the water bath and immediately placed in a freezer at a temperature of approximately −29° C. The test panels remained in the freezer for a period of 3 hours before being removed. Once the test panels were removed from the freezer, an "X" was scribed on the surface of the substrate using the method described in Example 4. After the "X" was scribed, within 60 seconds from freezer removal, low-pressure saturated steam at approximately 6 psi was blown from a steam generator nozzle for a period of 1 minute directly on the scribed "X" at a 45° angle. The steam nozzle was approximately 50 to 75 mm in distance from the scribed "X".

In each of the test panels no visual signs of defects in the layer adhesion were observed after the thermal shock test was completed. There was also no appearance of "blushing" in the scribe cuts, which is often caused by the layers absorbing moisture from the steam being blown into the cut.

Example 11

Four test panels manufactured according to the procedure of Example 1 were tested for filiform corrosion resistance in the following manner. Each of the four test panels contained a specific metal layer in which the first, second, third and fourth test panels contained an aluminum, nickel, chromium and chromium-nickel alloy metal layer, respectively. The test panels were first scribed using the method described in Example 4. After being scribed, the test panels were placed in fog chamber of a CASS solution of Example 9 for a period of 6 hours. The test panels were placed at a 45° angle in the chamber to prevent puddles of the CASS solution in the scribe cut. After the test panels were removed from the chamber, they were thoroughly rinsed with deionized water to remove all CASS solution residues. The test panels then were directly placed in the humidity apparatus of Example 3. The test panels remained in the humidity apparatus for a period of 672 hours at the same conditions used in Example 3. After the test panels were removed from the humidity apparatus, the aluminum metal layer of the first test panel showed signs of creep and corrosion. It was observed that the other test panels displayed less than 4 mm of filiform corrosion from the scribe cut. Furthermore, it was observed that no filament corrosion growth occurred on the non-scribed areas of all of the test panels.

Although the above-described embodiments constitute the preferred embodiments, it will be understood that various changes or modifications can be made thereto without departing from the spirit and the scope of the present invention as set forth in the appended claims.

What is claimed is:

1. A layered structure comprising a heat-tempered metal substrate, a thermally-cured leveling layer overlying the substrate, a radiation-cured acrylated urethane polymer layer overlying the thermally-cured leveling layer, a continuous decorative metal layer overlying and in contact with the radiation-cured layer, and a thermally-cured top coat layer overlying the decorative metal layer, wherein the leveling layer and the top coat layer have the same composition.

2. The layered structure of claim 1, wherein the thermally-cured leveling layer is a thermoset composition.

3. The layered structure of claim 2, wherein the thermoset composition is an acrylated polymer resin.

4. The layered structure of claim 1, wherein the radiation-cured layer is a cross-linked acrylated polyester urethane polymer.

5. The layered structure of claim 1, wherein the thermally-cured top coat layer is a thermoset composition that is clear and colorless.

6. The layered structure of claim 1, said top coat layer having a thickness of 10 to 100 microns.

7. The layered structure of claim 1, said thermally-cured leveling layer having a thickness of 10 to 100 microns.

8. The layered structure of claim 1, said radiation-cured layer having a thickness of 1 to 100 microns.

9. The layered structure claim 1, said decorative metal layer having a thickness of 10 to 2,500 angstroms.

10. The layered structure of claim 1, said thermally-cured leveling layer being in direct contact with said substrate, and said radiation-cured layer being in direct contact with said thermally-cured leveling layer.

11. The layered structure of claim 1, further comprising an additional layer disposed intermediate adjacent ones of said substrate, said thermally-cured leveling layer, and said radiation-cured layer.

12. The layered structure of claim 1, said substrate being an automotive wheel.

13. The layered structure of claim 1, said substrate being an automotive metal bumper.

14. The layered structure of claim 1, said substrate being an automotive trim component.

15. The layered structure of claim 1, said thermally-cured top coat layer providing corrosion protection to said layered structure so that following 1000 hours of continuous exposure, at a temperature of approximately 35° C., to a fog of salt water comprising 5 grams of NaCl per 95 ml of water and having a pH of 6.5 to 7.2, a 4 inch by 8 inch panel having said layered structure into which a scribe cut was previously made perpendicular to the surface of the substrate, beginning at said top coat layer and penetrating through all the layers deposited over the substrate, but not significantly piercing the surface of the substrate, exhibits no visible signs of corrosion on the surface of the top coat layer and only mild signs of corrosion less than 2 mm from the edge of the scribed cut are visible.

16. The layered structure according to claim 15, said thermally-cured top coat layer being in contact with the decorative metal layer.

17. A method of applying a decorative metal finish to a substrate comprising the steps of:
  a) providing a heat-tempered metal substrate having a substrate surface,
  b) providing a thermally-cured leveling layer overlying said substrate surface,
  c) providing a radiation-cured acrylated urethane polymer layer overlying said leveling layer, and
  d) providing a continuous decorative metal layer overlying and in contact with said radiation-cured layer, and
  e) providing a thermally-cured top coat layer overlying the decorative metal layer, wherein the leveling layer and the top coat layer have the same composition.

18. The method of claim 17, said radiation-cured layer being cured via exposure to ultraviolet radiation.

19. The method of claim 17, said radiation-cured layer being provided by depositing a radiation-curable material onto the immediately subjacent layer via a deposition method selected from the group consisting of spraying, air atomized spraying and air atomized spraying with electrostatic discharge, to provide an uncured radiation-curable layer, and curing said radiation-curable layer via exposure to radiation to thereby provide said radiation-cured layer.

20. The method of claim 19, further comprising, prior to curing the uncured radiation-curable layer, heating said radiation-curable layer to a temperature in the range of about 150 to 200° F. to level out that layer and thereby to present a more uniformly flat, even surface thereof.

21. The method of claim 17, said thermally-cured leveling layer being provided by
  depositing a thermally-curable material onto the immediately subjacent layer via a deposition method selected from the group consisting of spraying, brushing, electrostatic spraying, frictional electrification and dipping, to provide an uncured thermally-curable layer, and
  curing said thermally-curable layer to thereby provide said thermally-cured leveling layer.

22. The method according to claim 21, comprising curing said thermally-curable layer by
  first, pre-curing the thermally-curable layer by heating that layer from ambient temperature, at which it is deposited, to a pre-cure temperature of approximately 250 to 290° F. at a temperature rise rate of 30 to 80° F. per minute, and maintaining the thermally-curable layer at said pre-cure temperature for 1 to 12 minutes,
  second, maintaining said thermally-curable layer at a curing temperature in the range of approximately 260 to 375° F. for 10 to 45 minutes to provide said thermally-cured leveling layer.

23. The method according to claim 22, further comprising cooling the thermally-cured leveling layer from said curing temperature to a temperature in the range of approximately 100 to 200° F., and thereafter depositing a radiation-curable layer thereon and curing said radiation-curable layer to provide said radiation-cured layer.

24. The method of claim 17, said thermally-cured leveling layer being cured by heating to a temperature not above 375° F. for a period of time not more than 30 minutes.

25. The method of claim 24, said thermally-curable material being a thermoset composition that is deposited in the form of a powder coating composition that cures when exposed to heat, said powder coating composition comprising a film forming material selected from the group consisting of epoxy resin, epoxy-polyester resin, polyester resin, acrylic resin, acryl-polyester resin, fluororesin and mixtures thereof.

26. The method of claim 25, said film forming material being an acrylic resin.

27. The method of claim 26, said acrylic resin having a 60° gloss value of greater than 90, a specific gravity of about 1.11, a cure schedule of 25 minutes at 325° F. metal temperature, and a pencil hardness value after cure of 2H.

28. The method of claim 25, said powder coating composition further comprising about 3 to 50 weight percent of a curing agent effective to cross-link said film forming material on exposure to heat.

29. The method of claim 25, said thermally-cured leveling layer and said thermally-cured top coat layer being provided according to like methods.

30. The method of claim 19, said radiation-curable material being provided and deposited in the form of a radiation-curable acrylated or methacrylated polyester urethane liquid.

31. The method of claim 19, said radiation-curable material comprising a polymeric film forming material, a radiation sensitive monomer having polymerizable unsaturated bonds, a photopolymerization initiator, and an inert solvent vehicle.

32. The method of claim 19, said radiation-curable material being selected to provide said radiation-cured layer that is effective to provide a strong adhesive bond with said decorative metal layer that is deposited thereon and in contact therewith via physical vapor deposition.

33. The method of claim 19, said radiation-curable material being a UV-curable acrylated urethane liquid resin comprising not more than 30 weight percent butyl acetate, not more than 15 weight percent multifunctional acrylate, not more than 10 weight percent xylene, not more than 10 weight percent mineral spirits, not more than 5 weight percent dipentaerythritol monohydroxypenta-acrylate, not more than 5 weight percent photoinitiator, not more than 5 weight percent methyl N-amyl ketone, and not more than 5 weight percent ethyl benzene.

34. The method of claim 17, further comprising providing a pretreatment layer in the form of a conversion coating intermediate said substrate and said thermally-cured leveling layer.

35. The method of claim 34, said conversion coating being selected from the group consisting of phosphate, iron, zinc, chromium and manganese conversion coatings, and combinations thereof, and being deposited onto said substrate via a spray coating technique.

36. A method of applying a decorative metal finish to a heat-tempered metal substrate comprising the steps of:
   a) depositing a thermally-curable leveling layer onto or overlying a surface of said heat-tempered metal substrate,
   b) depositing a radiation-curable composition comprising a polymerizable acrylated urethane onto or overlying said thermally-cured leveling layer,
   c) irradiating said radiation-curable composition with electromagnetic radiation, whereby said polymerizable acrylated urethane is cross-linked to form an acrylated urethane polymer layer from said radiation-curable composition,
   d) depositing a continuous decorative metal layer onto and in contact with said acrylated urethane polymer layer, whereby said metal layer is adhered thereto, and
   e) depositing a thermally-curable top coat layer over said decorative metal layer, wherein said leveling layer and said top coat layer have the same composition.

37. The method according to claim 36, said irradiating step being carried out using ultraviolet radiation.

38. The method according to claim 36, said radiation-curable composition being deposited onto or overlying said substrate surface in the form of a liquid resin.

39. The method according to claim 36, said decorative metal layer being deposited via a method selected from the group consisting of physical vapor deposition, chemical vapor deposition, magnetron sputtering and plasma deposition.

40. The method according to claim 36, said leveling layer being deposited by depositing a a thermally-curable powder coating composition onto said substrate surface, and subsequently curing said thermally-curable composition at a temperature not higher than 375° F. to provide said leveling layer, and said top coat layer being deposited by depositing a said thermally-curable powder coating composition onto said metal layer, and subsequently curing said thermally-curable composition on said metal layer at a temperature not higher than 375° F. to provide said top coat layer.

41. The method of claim 40, said thermally-curable powder coating composition being a thermoset powder comprising 50% to 97% acrylic resin.

42. The method of claim 40, said substrate being heat-tempered aluminum or steel.

43. The method of claim 42, said substrate being an automobile wheel.

\* \* \* \* \*